US007088972B2

(12) United States Patent
Brown et al.

(10) Patent No.: US 7,088,972 B2
(45) Date of Patent: Aug. 8, 2006

(54) DISTRIBUTED DATA TRANSMITTER

(75) Inventors: Kenneth Dewayne Brown, Grain Valley, MO (US); David Dunson, Kansas City, MO (US)

(73) Assignee: Honeywell Federal Manufacturing & Technologies, LLP, Kansas City, MO (US)

( * ) Notice: Subject to any disclaimer, the term of this patent is extended or adjusted under 35 U.S.C. 154(b) by 545 days.

(21) Appl. No.: 10/271,459

(22) Filed: Oct. 15, 2002

(65) Prior Publication Data

US 2004/0070465 A1  Apr. 15, 2004

(51) Int. Cl.
*H05K 7/10* (2006.01)

(52) U.S. Cl. .................. 455/128; 455/100; 455/349; 361/730; 361/728; 439/701

(58) Field of Classification Search ............... 455/128, 455/98, 99, 100, 127.1, 127.5, 349, 347; 332/101; 375/297; 361/728, 729, 730, 731; 439/701
See application file for complete search history.

(56) References Cited

U.S. PATENT DOCUMENTS

| 4,688,864 A | * | 8/1987 | Sorel ........................... 439/74 |
| 4,928,099 A | | 5/1990 | Drake |
| 5,020,135 A | | 5/1991 | Kasparian et al. |
| 5,412,426 A | | 5/1995 | Totty |
| 5,450,046 A | * | 9/1995 | Kosugi et al. .............. 333/246 |
| 5,781,847 A | | 7/1998 | Clarke et al. |
| 5,945,855 A | * | 8/1999 | Momtaz ....................... 327/157 |
| 5,963,650 A | | 10/1999 | Simionescu et al. |
| 6,157,621 A | | 12/2000 | Brown et al. |
| 6,198,456 B1 | | 3/2001 | Le Halle et al. |
| 6,208,266 B1 | | 3/2001 | Lyons et al. |
| 6,377,784 B1 | * | 4/2002 | McCune ..................... 455/108 |
| 6,434,187 B1 | * | 8/2002 | Beard et al. ................ 375/219 |
| 6,704,549 B1 | * | 3/2004 | Sorrells et al. ............. 455/102 |
| 6,748,021 B1 | * | 6/2004 | Daly ........................... 375/261 |
| 6,766,143 B1 | * | 7/2004 | Beckwith .................... 455/66.1 |

FOREIGN PATENT DOCUMENTS

| EP | 0112039 | 6/1984 |
| EP | 0728379 | 2/2001 |
| WO | 9608083 | 3/1996 |

* cited by examiner

*Primary Examiner*—Nguyen T. Vo
*Assistant Examiner*—Adeel Haroon
(74) *Attorney, Agent, or Firm*—Hovey Williams LLP

(57) ABSTRACT

A distributed data transmitter (DTXR) which is an adaptive data communication microwave transmitter having a distributable architecture of modular components, and which incorporates both digital and microwave technology to provide substantial improvements in physical and operational flexibility. The DTXR has application in, for example, remote data acquisition involving the transmission of telemetry data across a wireless link, wherein the DTXR is integrated into and utilizes available space within a system (e.g., a flight vehicle). In a preferred embodiment, the DTXR broadly comprises a plurality of input interfaces; a data modulator; a power amplifier; and a power converter, all of which are modularly separate and distinct so as to be substantially independently physically distributable and positionable throughout the system wherever sufficient space is available.

21 Claims, 3 Drawing Sheets

DISTRIBUTED DATA TRANSMITTER

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to microwave transmitter architecture and components. More particularly, the present invention concerns an adaptive data communication microwave transmitter having a distributable architecture of modular components, and incorporating both digital and microwave technology to provide substantial improvement in flexibility of use; and has broad application in, for example, the transmission of data across a wireless link.

2. Description of the Prior Art

It is often desirable to receive telemetry data from, for example, a system under test or otherwise monitored. Such data is typically transmitted using a prior art monolithic microwave transmitter having a unitary design of fixed shape and dimensions. Unfortunately, where the system was not initially designed to accommodate the transmitter, it can often be very difficult or impossible to integrate the transmitter into the available space. This is a particular problem where the transmitter must be enclosed within the system's existing housing, such as, for example, where the system is part of a flight vehicle. Furthermore, while it may be possible in such situations to undertake a substantial repositioning of the system's components to make space for and otherwise accommodate the transmitter, doing so is likely undesirably or prohibitively costly and time-consuming and may sufficiently change the system so as to undermine the very test meant to be performed. Thus, the physical characteristics of prior art transmitters are typically inflexible, making the transmitters physically unadaptable and unsuitable for use in a variety of applications or changing conditions.

Furthermore, even where space can be found or made within the system for the monolithic transmitter, any need to repair or replace the transmitter, such as when different operating characteristics are desired, requires that the entire transmitter be removed from the system. Unfortunately, the replacement transmitter, if it is of a different shape or size than the replaced transmitter, may not fit within the same space.

It will also be appreciated by those with ordinary skill in the art that prior art transmitters are notoriously inflexible with regard to their operating characteristics. Thus, prior art transmitters typically suffer from, for example, a rigid analog technology; limited data throughput; fixed data rates; fixed deviation; fixed spectrum; fixed analog modulation; and fixed power capacity, such that they are typically operatively unadaptable and not suitable for use in a variety of applications or changing conditions.

Due to the above-identified and other problems and disadvantages in the art, a need exists for an improved data transmitter.

SUMMARY OF THE INVENTION

The present invention overcomes the above-described and other problems and disadvantages in the prior art with a distributed data transmitter (DTXR) which is an adaptive data communication microwave transmitter having a distributable architecture of modular components and incorporating both digital and microwave technology to provide substantial improvements in physical and operational flexibility. The DTXR has application in, for example, remote data acquisition involving the transmission of telemetry data across a wireless link, wherein the DTXR is integrated into and utilizes available space within a system (e.g., a flight vehicle).

In a preferred embodiment, the DTXR broadly comprises a plurality of input interfaces; a digital data modulator; a power amplifier; and a power converter, all of which are modularly separate and distinct from one another so as to be substantially independently physically distributable and positionable throughout the system wherever sufficient space is available.

The plurality of input interfaces provide a variety of inputs to the various other components of the DTXR, and include a PCM data input; a DC power input; a clock input; a modulation mode control (MMC) input; a configuration interface; and a power control interface. The PCM data input provides a serial PCM data stream to the modulator. The DC power input provides a DC power signal to the converter. The clock input provides clock or other timing signals to the modulator. The MMC input allows for selecting a type of modulation technique to be used by the modulator. The configuration interface allows for downloading operating parameters for other components of the DTXR, particularly the modulator and the amplifier. The power control interface allows for controlling the converter, particularly with regard to placing the converter into an energy-conserving sleep mode.

The modulator is adapted to modulate the data stream, and supports a plurality of modulation techniques, including, for example, PCM/FSK, PCM/SOQPSK, and CPM modulation techniques. The modulator includes a digital processor; a quadrature microwave mixer; and a programmable local oscillator (LO). The digital processor is based on EPLD technology and is adapted to support combinational and sequential logic systems with flexible I/O interfaces. The digital processor may employ one of several alternative approaches to shaping the frequency content of the quadrature outputs, including, for example, unfiltered, linear, gaussian, and Nyquist. Depending on the parameters used for these filters, various spectral bandwidths can be achieved, which allows for balancing between bit error rate (BER), bandwidth, and adjacent channel interference considerations.

The LO is adapted to provide a carrier signal having a particular frequency, and is based on a commercial frequency synthesizer to operate across the lower and upper S microwave bands, including the frequency range of approximately between 2.2 GHz to 2.4 GHz. The carrier signal frequency is programmable using the configuration interface.

The mixer is adapted to combine the modulated data stream from the modulator with the carrier signal from the LO and to provide the resulting signal to the power amplifier. The mixer is based on a commercial MMIC mixer and analog signal condition.

The power amplifier amplifies and transmits the modulated data stream. The amplifier includes a five stage amplifier chain, with the first four stages being included in a 1 W, 30 dBm driver, and the fifth stage being a 10 W, 40 dBm output stage. The output of the output stage is routed through a Wilkinson power splitter and miniature isolators to yield up to two microwave modulated carrier signals. The amplifier's output can take any of several configurations. The output can be, for example, two 5 W outputs that include 30 dB of internal isolation for direct connection to an antenna. The two outputs, it will be appreciated, provide the capability to drive two antennas. Alternatively, the output can be configured for a direct single 10 W output that includes up to 30 dB of internal isolation. The single output configuration can be used when external combiners are present to mix the DTXR with other transmitters on a single antenna.

The power converter receives the power signal from the DC power input and processes and provides the power signal to the modulator and the amplifier. The power converter includes two DC-to-DC converter subsystems for providing power to the modulator and the amplifier. Where practical and desirable, the converter can be integrated into the system's power supply.

Thus, it will be appreciated that the DTXR of the present invention provides a number of substantial advantages over the prior art, including, for example, substantially greater flexibility in both form and function than prior art fixed monolithic transmitters. More specifically, the modularity and distributability of the various components allows for fitting the components easily and quickly into available spaces in a system without requiring modification or relocation of the components of the system.

Furthermore, the DTXR's modularity allows for easier interchangeability of its components. Each module can be easily and conveniently removed and replaced without removing other modules. This allows for quickly and efficiently customizing the DTXR's capabilities and performance to particular applications. Thus, whereas prior art transmitters have fixed, inflexible attributes, capabilities, and performance, the DTXR facilitates customization and modification to accommodate a variety of different applications or changing demands in the same application.

Additionally, the DTXR incorporates digital and microwave technology to provide substantial improvements in flexibility of use by way of a programmable carrier frequency, a variable RF spectrum, a variable data rate, a scalable output power, a customizable efficiency, an adaptable multi-mode modulation, and a customizable bandwidth.

Additionally, each distinct module or submodule of the DTXR is received in a housing adapted to further enhance modularity and distributability with standardized mechanical and electrical connectors, thereby advantageously allowing for substantially any distributed or co-located physical arrangement of the housings, including stacking, end-to-end, side-to-side, or any combination thereof.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
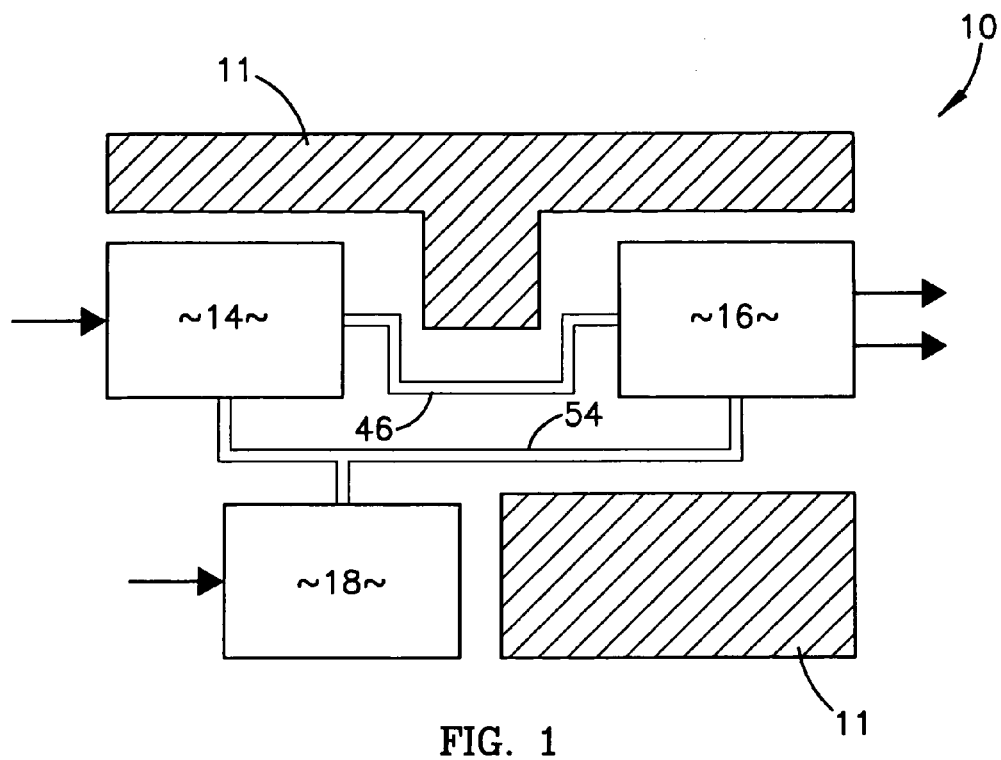
FIG. 1 is a high level block diagram of a plurality of components of a preferred first embodiment of the DTXR of the present invention.
Figure 2:
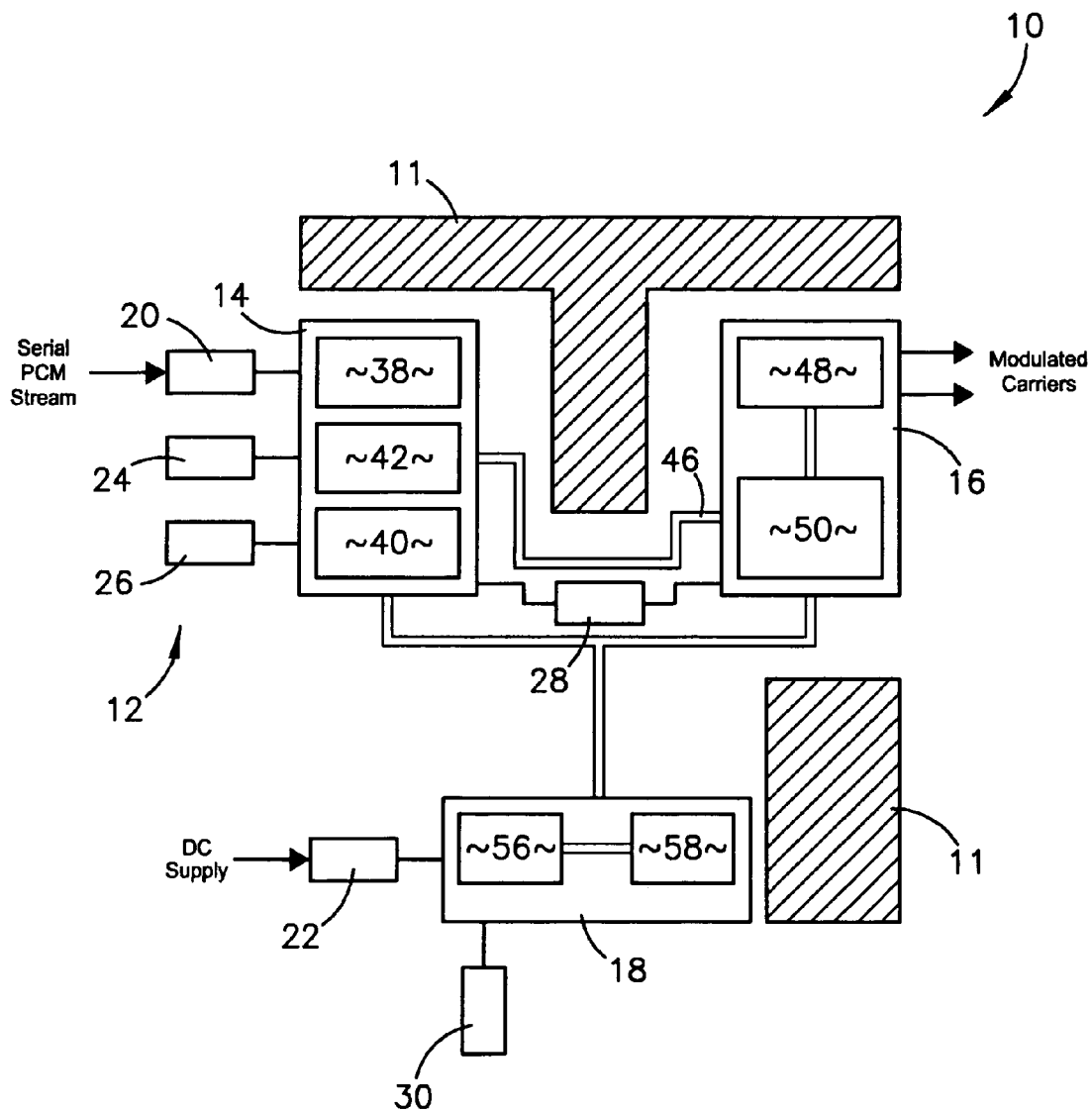
FIG. 2 is a low level block diagram of the components of the DTXR of FIG. 1.

Referring to FIGS. 1 and 2, a distributed data transmitter (DTXR) 10 is shown constructed in accordance with a preferred first embodiment of the present invention. The DTXR 10 is an adaptive data communication microwave transmitter having a distributable architecture of modular components and incorporating both digital and microwave technology to provide substantial improvements in flexibility of use by way of a programmable carrier frequency, a variable RF spectrum, a variable data rate, a scalable output power, an adaptable multi-mode modulation, and a customizable bandwidth. The DTXR 10 has application in, for example, remote data acquisition involving the transmission of telemetry data across a wireless link, wherein the DTXR 10 is integrated into and utilizes available space within a system 11 (e.g., a flight vehicle).

In a preferred embodiment, the DTXR 10 broadly comprises a plurality of input interfaces 12; a data modulator 14; a power amplifier 16; and a power converter 18, all of which are modularly separate and distinct so as to be substantially independently physically distributable and positionable throughout the system 11 wherever sufficient space is available.

The plurality of input interfaces 12 provide a variety of inputs to the various other components of the DTXR 10, and include a PCM data input 20; a DC power input 22; a clock input 24; a modulation mode control (MMC) input 26; a configuration interface 28; and a power control interface 30. The PCM data input 20 provides a serial PCM data stream to the modulator 14, with the data stream containing either NRZ or Biphase PCM data at TTL signal levels. The DC power input 22 provides a DC power signal to the converter 18. The DC power can swing between 24V and 36V and the converter 18 will continue to function. The DTXR 10 requires approximately between 1.3 A and 2 A at full output power. The clock input 24 provides clock or other timing signals to the modulator 14, which should be synchronous with the PCM bit rate, at TTL levels. Note, however, that the DTXR 10 is readily adapted for use without such an external clock input, in which case timing signals are instead derived from the data stream itself. The MMC input 26 provides a TTL logic signal that selects the type of modulation technique used by the modulator 14, wherein a default input (logic 0) configures the DTXR 10 for PCM/FSK operation and a logic 1 input configures the DTXR 10 for PCM/SOQPSK. The configuration interface 28 is adapted to download parameters to configure operation of other components of the DTXR 10, particularly the modulator 14 and the amplifier 16. The power control interface 30 is adapted to allow for externally controlling operation of the converter 18, including turning-off of power to the converter 18 to place it in a power-conserving sleep mode.

The data modulator 14 is adapted to modulate the data stream received from the PCM data input. The modulator 14 supports both PCM/FSK and PCM/SOQPSK modulation techniques, and provides data throughput of 5 Mb/s with the FSK technique and up to 25 Mb/s with the SOQPSK technique. The modulator 14 can also be adapted to support more spectrally efficient modulation techniques, such as, for example, CPM. As mentioned, the MMC input 26 determines the modulation technique used. Typical spectral skirts are below 50 dBc at twice the data rate. A deviation index of 1.12 is found for the FSK technique, and a deviation index of 0.78 is found for the SOQPSK technique. The modulator 14 includes a number of primary subsystems, including a digital processor 38; and a programmable local oscillator (LO) 40; and a quadrature microwave mixer 42.

The digital processor 38 is based on EPLD technology and is adapted to support combinational and sequential logic systems with flexible I/O interfaces. The digital processor 38 may employ one of several alternative approaches to shaping the frequency content of the quadrature outputs, including, for example, unfiltered, linear, gaussian, and Nyquist, or otherwise processing the data stream. One function of the configuration interface 28 is to download parameters to the digital processor 38 to control operation thereof. Depending on the parameters used for these filters, various spectral bandwidths can be achieved, which allows for balancing between bit error rate (BER), bandwidth, and adjacent channel interference considerations.

The programmable LO 40 is adapted to provide a carrier signal having a particular selected frequency. The LO 40 is based on a commercial frequency synthesizer, and operates across the lower and upper S microwave bands, including the frequency range of approximately between 2.2 GHz to 2.4 GHz. One function of the configuration interface 28 is to download parameters to the LO 40 to control operation thereof, including programming of the carrier signal frequency. The LO configuration is bootstrapped with a PIC processor, and programming of the LO 40 is completed through the PlC's interface.

The quadrature microwave mixer 42 is adapted to combine the modulated data stream from the data processor with the carrier signal from the LO 40 and output the resulting modulated data stream to the amplifier 16. The mixer 42 is based on a commercial MMIC mixer and analog signal conditioning.

Those with skill in the art will appreciate that the present invention advantageously allows for an adjustable RF spectrum which is controlled by using the configuration interface 28 to program such parameters as carrier frequency, modulation technique, data rate, and filtering. Furthermore, the present invention advantageously allows for an adjustable data rate which is controlled by using the clock signal from the clock input 24, a clock multiplier, and the digital processor 38 to produce a particular data rate. The range is continuous from 50 kBps to 5 MBps for FM, and continuous from 50 kBps to 25 MBps for SOQPSK. In one implementation, the clock signal must be some multiple of the data rate and is multiplied to some higher rate suitable as an internal clock signal. In another implementation, however, the clock input 24 is eliminated and the internal clock signal replaced by a timing signal derived from the data stream itself. Additionally, the present invention advantageously allows for a customizable bandwidth The modulator 14 is constructed on two printed circuit boards (PCBs) of FR4 and RF substrates and is enclosed in a single gold plated aluminum housing. In one embodiment, the mounting footprint of the modulator 14 is approximately 1.25 inches by 2.25 inches, the height is approximately 0.50 inches, and the mass is approximately 46.5 grams. These physical requirements can be reduced substantially, however, through use of appropriate technologies, including, for example, MCM substrate technology.

The power amplifier 16 is connected to the modulator 14 by an RF interconnect cable 46 and is adapted to amplify and provide for transmission the modulated data stream. The amplifier 16 includes a five stage amplifier chain, with the first four stages being included in a 1 W, 30 dBm driver 48, and the fifth stage being a 10 W, 40 dBm output stage 50. As desired, the amplifier 16 can be divided into a number of separate modules, each including one or more of the driver or output stages, as described below. The driver 48 is based on commercial MMIC's; the output stage 50 is based on an LDMOS power transistor, and includes both input and output matching. The output of the output stage 50 is routed through a Wilkinson power splitter and miniature isolators to yield two microwave modulated carrier signals. One function of the configuration interface 28 is to download parameters to the driver 48 and the output stage 50 to control operation thereof, including gain adjustment.

Power can be scaled in the present invention using a combination of techniques. First, gross power adjustment can be accomplished by adding or removing amplifier stages, which, it will be appreciated, is facilitated through increased modularity. Then, fine power adjustment can be accomplished using either programmable attenuation networks or, as mentioned, programmable gain on the output stage 50.

The total output power of both carrier signals is approximately between 8 W and 9 W, but the DTXR 10 can be adapted to have a total output power of approximately between 10 mW and 100 mW or approximately between 20 W and 30 W. Such scalable output power makes the DTXR 10 compatible with a broad variety of applications. Furthermore, the amplifier 16 is readily modified so that the output power decreases linearly over time, thereby conserving power. Additionally, the amplifier's output can take any of several configurations. The output can be, for example, two 5 W outputs that include 30 dB of internal isolation for direct connection to an antenna. The two outputs, it will be appreciated, allow for driving two antennas. Alternatively, the output can be configured for a direct single 10 W output that includes up to 30 dB of internal isolation. The single output configuration can be used when external combiners are present to mix the DTXR 10 with other transmitters on a single antenna. In both cases, where external isolation is provided, the internal isolation can be eliminated to reduce mass. This flexibility makes the DTXR 10 easier to deploy.

The DTXR's efficiency is approximately 32%, though efficiencies of approximately between 50% and 60% are readily achievable. By contrast, prior art commercial transmitters are currently operating at less than 20%. It will be appreciated that increased efficiency allows for decreased battery size and overall correspondingly decreased overall size and weight. Furthermore, it will be appreciated that the present invention advantageously allows for a customizable efficiency which is primarily influenced by the efficiency of the output stage 50. One possible trade-off is to operate the output stage 50 for maximum output power, or maximum efficiency, or some point therebetween. These operating points are determined by the impedance matching networks on the input and output of a final transistor in the output stage 50. The output stage 50 can be implemented to allow for switching between either of these operating points by switching different matching networks in the output stage 50. These can be configured through the configuration interface 28.

The mounting footprint of each of the amplifier's stages is approximately 1 inch by 2 inches, the height is approximately 0.75 inches, the mass of the driver 48 is approximately 73.2 grams, and the mass of the output stage 50 is approximately 61.1 grams. These physical requirements can be reduced substantially, however, through use of appropriate technologies, including, for example, MCM substrate technology.

The power converter 18 is adapted to receive the DC power signal from the DC power input and to process and provide the power signal via power distribution cables 54 to both the modulator 14 and the amplifier 16. As mentioned, the power control interface 30 is adapted to allow for externally controlling operation of the converter 18, including turning-off of power to the converter 18 to place it in a power-conserving sleep mode. The converter 18 includes two DC-to-DC converter subsystems 56,58 to produce the necessary power supply levels for each of the other modules. A first DC-to-DC converter 56 provides 28V to the output stage 150 of the amplifier 16; a second DC-to-DC converter 58 provides all other voltages to the modulator 14 and the amplifier 16. As desired, the two DC-to-DC converters can be constructed as two separate and distinct, independently distributable and positionable submodules, thereby further enhancing the DTXR's physical flexibility and ability accommodate available space within the system 11. Output voltages for the modulator 14 are 3.3V and 5V, the output voltage for the driver 48 is 5.5V, and output voltages for the output stage 50 are 28V and 4.2V. The power budget for the DTXR 10 is approximately between 1.4 A and 1.6 A at 28V. Where possible, the converter 18 can be integrated into the system's power supply.

The mounting footprint of the converter 18 is approximately 2 inches by 3 inches, the height is approximately 1.5 inches, and the mass is approximately 317 grams. These physical requirements can be reduced substantially, however, through use of appropriate technologies, including, for example, MCM substrate technology.

Thus, as illustrated, the DTXR 10 has a combined mounting footprint of 14.9 square inches with the converter 18 and 7.82 square inches without it. This can be decreased to 5.5 square inches if the amplifier stages are stacked. External connectors and interconnection cables, however, can increase the total footprint. The DTXR 10 has a combined volume of 15.6 cubic inches with the converter, and 5 cubic inches without it. The combined mass of the DTXR 10 including interconnection cables, connector adapters, and mounting hardware is 0.511 Kg. The combined mass of the various modules without mounting hardware and external cables is 0.46 Kg. The mass of the DTXR 10 without the converter 18 is 180 g. As mentioned, these physical requirements can be reduced substantially through use of appropriate technologies, including, for example, MCM substrate technology. It will also be appreciated that the DTXR 10 can be implemented with a number of different physical configurations. For example, the dimensions and general shape of each module are substantially variable so as to accommodate available space. Furthermore, the electrical and physical interfaces between the modules only generically support communication between them, so each such interface can be substantially modified as needed to accommodate particular applications.

Figure 3:
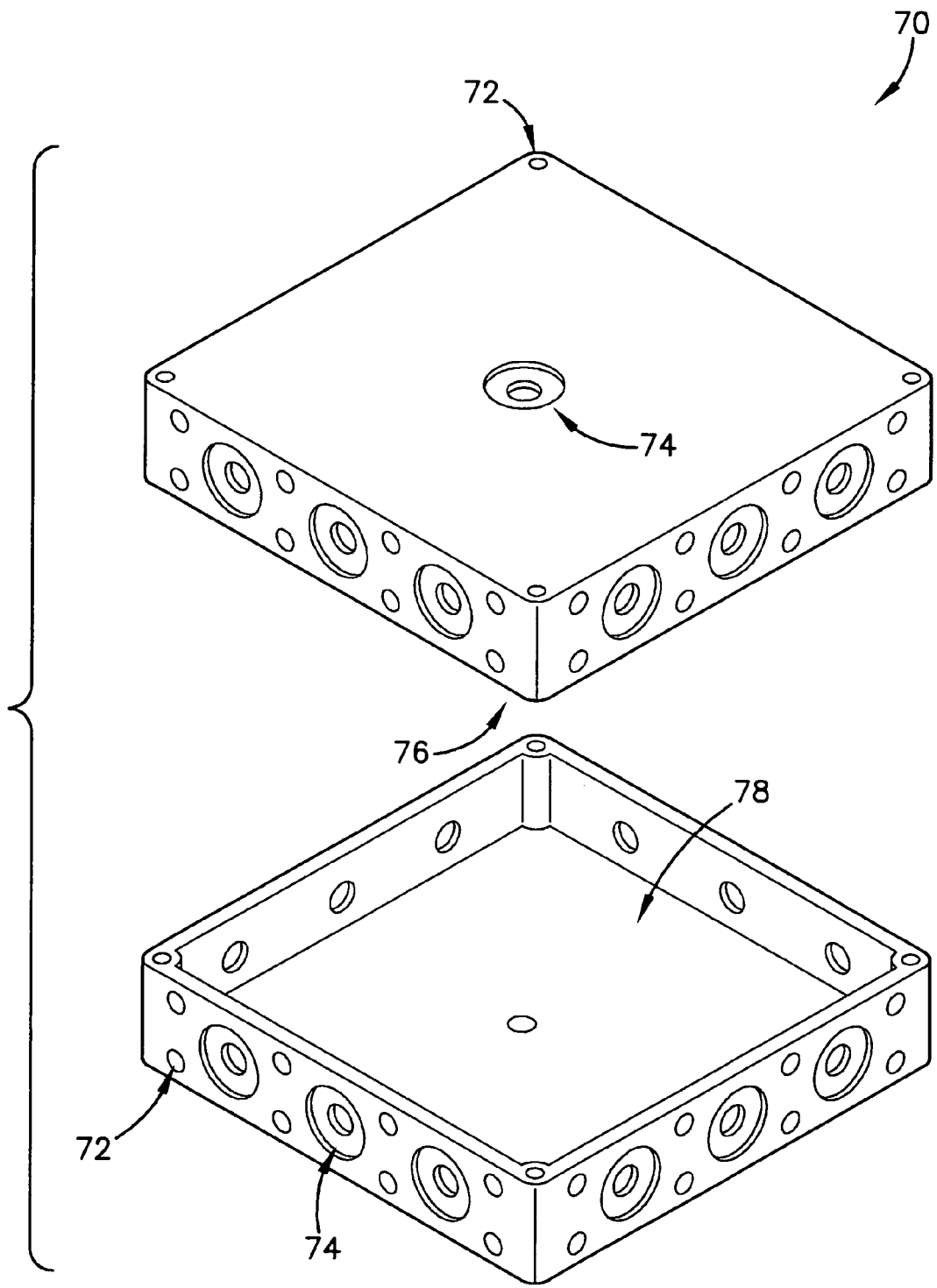
FIG. 3 is an exploded isometric view of a preferred embodiment of a housing for enclosing each of the plurality of components of the DTXR of FIG. 1.

Referring also to FIG. 3, the housings 70 for the various modules and submodules are adapted to further enhance the modularity and distributability features of the present invention. More specifically, both mechanical connections 72 and electrical connections 74 are included on each surface of each housing 70 and standardized to allow for substantially any distributed or co-located physical arrangement of the housings 70, including stacking, end-to-end, side-to-side, or any combination thereof. Thus, the housings 70 have the form and function of independent and distinct but connectable "building blocks". Furthermore, the housings 70 preferably provide an upper bay 76 and a lower bay 78, with each bay 76,78 adapted to receive a different PCB, thereby allowing for receiving at least two PCBs in each housing 70.

Figure 4:
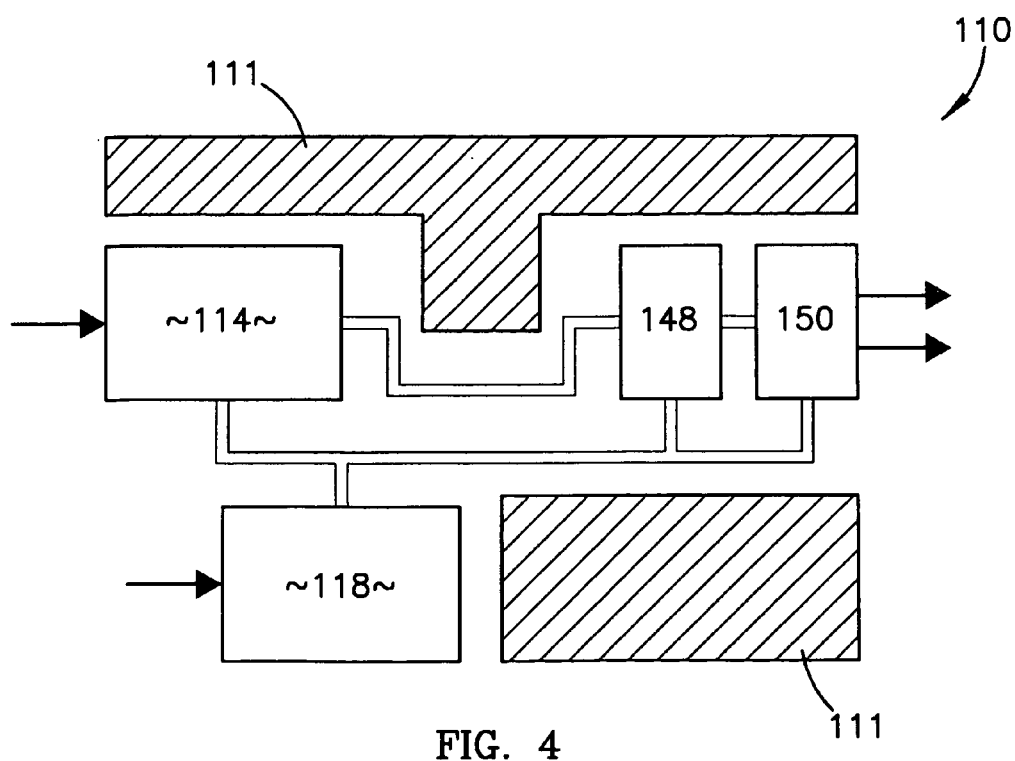
FIG. 4 is a high level block diagram of a plurality of components of a preferred second embodiment of the DTXR of the present invention.

Referring also to FIG. 4, a preferred second embodiment of the DTXR 110 is shown which is substantially similar to the preferred first embodiment described above but for the following differences. To illustrate further dividing the above described modules into smaller, even more flexibly distributed submodules, the amplifier is divided into a driver submodule 148 and an output stage submodule 150 which are separate, distinct, and independently positionable from one another. The driver submodule 148 is provided on two RF substrates and housed in a gold-plated aluminum housing; the output stage submodule 150 is similarly provided on an RF substrate and housed in its own gold-plated aluminum housing. The modulator 114 and the converter 118, though shown as single modules, could similarly be divided into smaller submodules, wherein such submodules correspond to a logical division of the larger module. Such submodules provide even greater flexibility in utilizing available space within the system 111.

From the preceding description, it will be appreciated that the DTXR 10 of the present invention provides a number of substantial advantages over the prior art, including, for example, substantially greater flexibility in both form and function than prior artfixed monolithic transmitters. More specifically, the modularity and distributability of the various components allows for fitting the components easily and quickly into available spaces in the system 11 and without requiring modification or relocation of the of the components of the system 11.

Furthermore, the DTXR's modularity allows for easier interchangeability of the DTXR's components. Each module can be easily and conveniently removed and replaced without removing other modules. This allows for quickly and efficiently customizing the DTXR's capabilities and performance to particular applications. Thus, whereas prior art transmitters have fixed, inflexible attributes, capabilities, and performance, the DTXR 10 facilitates customization and modification to accommodate a variety if different applications or changing demands in the same application.

Additionally, the DTXR 10 incorporates digital and microwave technology to provide substantial improvements in flexibility of use by way of a programmable carrier frequency, a variable RF spectrum, a variable data rate, a scalable output power, a customizable efficiency, an adaptable multi-mode modulation, and a customizable bandwidth.

Additionally, each distinct module or submodule of the DTXR 10 is received in a housing 70 adapted to further enhance modularity and distributability with standardized mechanical and electrical connectors 72,74, thereby advantageously allowing for substantially any distributed or co-located physical arrangement of the housings 70, including stacking, end-to-end, side-to-side, or any combination thereof.

Although the invention has been described with reference to the preferred embodiments illustrated in the attached drawings, it is noted that equivalents may be employed and substitutions made herein without departing from the scope of the invention as recited in the claims. Thus, for example, the DTXR is not limited to the particular modules or number of modules described herein, but may instead include modules or submodules representing any logical groupings or subgroupings of components.

Having thus described the preferred embodiment of the invention, what is claimed as new and desired to be protected by Letters Patent includes the following:

1. A data transmitter for incorporation into a system, the data transmitter comprising:
   a data modulator module adapted to receive a data stream from the system and to modulate the data stream;
   a power amplifier module adapted to receive the modulated data stream from the data modulator module and to amplify and output the modulated data stream for transmittal;
   a power converter module adapted to provide power to both the data modulator module and the power amplifier module; and
   a plurality of housings for housing the data modulator module, the power amplifier module, and the power converter module, such that each module is physically separate and distinct from the other modules, wherein a side of a first housing is mechanically and electrically connectable to either of a first side or a second side of a second housing such that communication of electrical signals between modules is preserved regardless of which side of the second housing the first housing is connected to,
   wherein each housing further includes at least the data modulator module, the power amplifier module, or the power converter module, such that each module is physically separate and distinct from the other modules, each of said housings having a plurality of sides, wherein each side includes at least two connecting elements, with a first element comprising a standardized connection for rigidly aligning a side of a first housing to a side of a second housing such that the housings can be interconnected according to several different arrangements, and a second element comprising a standardized electrical connection, wherein any side of a first housing secured to any side of a second housing is also electrically connected via the electrical elements of the first and second housings.

2. The data transmitter as set forth in claim 1, wherein the data transmitter is adapted to transmit at a microwave frequency.

3. The data transmitter as set forth in claim 1, wherein the data modulator module supports both a first modulation technique and a second modulation technique.

4. The data transmitter as set forth in claim 1, wherein the data modulator module includes—
   a digital processor adapted to process the data stream;
   a local oscillator adapted to provide a carrier signal having a programable frequency; and
   a quadrature mixer adapted to combine the processed data stream with the carrier signal.

5. The data transmitter as set forth in claim 1, wherein the power amplifier module includes a driver submodule and an output stage submodule, with the driver submodule and the output stage submodule each being substantially independently physically distributable and locatable relative to one another in the system.

6. The data transmitter as set forth in claim 1, wherein the power converter module is integrated into a power supply portion of the system.

7. The data transmitter as set forth in claim 1, wherein the power converter module includes a first DC-to-DC converter submodule for providing power to the power amplifier module at a first voltage and a second DC-to-DC converter submodule for providing power to the data modulator module and to the power amplifier module at a second voltage, with the first DC-to-DC converter submodule and the second DC-to-DC converter submodule each being substantially independently physically distributable and locatable relative to one another in the system.

8. The data transmitter as set forth in claim 1, further including a plurality of input interfaces, including—
   a data input adapted to provide the data stream to the data modulator module;
   a power input adapted to provide a DC power signal to the power converter module;
   a clock input adapted to provide a timing signal to the data modulator module;
   a modulation mode control input adapted to allow for selecting between a first modulation technique and a second modulation technique to be used by the data modulator module in modulating the data stream;
   a configuration interface adapted to provide operating parameters to the data modulator module and the power amplifier module; and
   a power control interface adapted to control operation of the power converter module.

9. A data transmitter for incorporation into a system, the data transmitter comprising:
   a data modulator module adapted to receive a data stream from the system and to modulate the data stream, with the data modulator module including—
      a digital processor adapted to process the data stream,
      a local oscillator adapted to provide a carrier signal having a programable frequency, and
      a quadrature mixer adapted to combine the processed data stream with the carrier signal;
   a power amplifier module adapted to receive the modulated data stream from the data modulator module and to amplify and output the modulated data stream for transmittal; and
   a power converter module adapted to provide power to both the data modulator module and the power amplifier module, with the power converter module including—
      a first DC-to-DC converter for providing power to the power amplifier module at a first voltage, and
      a second DC-to-DC converter for providing power to the data modulator module and the power amplifier module at a second voltage, and
   a plurality of housings for housing the data modulator module, the power amplifier module, and the power converter module such that each module is physically separate and distinct from the other modules, wherein a side of a first housing is mechanically and electrically connectable to either of a first side or a second side of a second housing such that communication of electrical signals between modules is preserved regardless of which side of the second housing the first housing is connected to,
   wherein each housing further includes at least the data modulator module, the power amplifier module, or the power converter module, such that each module is physically separate and distinct from the other modules, each of said housings having a plurality of sides, wherein each side includes at least two connecting elements, with a first element comprising a standardized connection for rigidly aligning a side of a first housing to a side of a second housing such that the housings can be interconnected according to several different arrangements, and a second element comprising a standardized electrical connection, wherein any side of a first housing secured to any side of a second housing is also electrically connected via the electrical elements of the first and second housings.

10. The data transmitter as set forth in claim 9, wherein the data transmitter is adapted to transmit at a microwave frequency.

11. The data transmitter as set forth in claim 9, wherein the data modulator module supports both a first modulation technique and a second modulation technique.

12. The data transmitter as set forth in claim 9, wherein the power amplifier module includes a driver submodule and an output stage submodule, with the driver submodule and the output stage submodule each being substantially independently physically distributable and locatable relative to one another in the system.

13. The data transmitter as set forth in claim 9, wherein the power converter module is integrated into a power supply portion of the system.

14. The data transmitter as set forth in claim 9, further including a plurality of input interfaces, including—
   a data input adapted to provide the data stream to the data modulator module;
   a power input adapted to provide a DC power signal to the power converter module;
   a clock input adapted to provide a timing signal to the data modulator module;
   a modulation mode control input adapted to allow for selecting between a first modulation technique and a second modulation technique to be used by the data modulator module in modulating the data stream;
   a configuration interface adapted to provide operating parameters to the data modulator module and the power amplifier module; and
   a power control interface adapted to control operation of the power converter module.

15. A data transmitter for incorporation into a system, with the data transmitter being adapted to transmit at a microwave frequency, the data transmitter comprising:
   a data modulator module adapted to receive a data stream from the system and to modulate the data stream, with the data modulator module including—
      a digital processor adapted to process the data stream,
      a local oscillator adapted to provide a carrier signal having a programable frequency, and
      a quadrature mixer adapted to combine the processed data stream with the carrier signal;
   a power amplifier adapted to receive the modulated data stream from the data modulator module and to amplify and output the modulated data stream for transmittal, with the power amplifier including a driver submodule and an output stage submodule;
   a power converter adapted to provide power to both the data modulator module and the power amplifier, with the power converter including a first DC-to-DC converter submodule for providing power to the output stage submodule of the power amplifier at a first voltage and a second DC-to-DC converter submodule for providing power to the data modulator module and to the driver submodule of the power amplifier; and
   a plurality of housings for housing the data modulator module, the driver submodule, the output stage submodule, the first DC-to-DC converter submodule, or the second DC-to-DC converter submodule such that each module or submodule is physically separate and distinct from the other modules and submodules, wherein a side of a first housing is mechanically and electrically connectable to either of a first or second side of a second housing such that communication of electrical signals between modules and submodules is preserved regardless of which side of the second housing the first is connected to,
   wherein each housing further includes at least the data modulator module, the power amplifier module, or the power converter module, such that each module is physically separate and distinct from the other modules, each of said housings having a plurality of sides, wherein each side includes at least two connecting elements, with a first element comprising a standardized connection for rigidly aligning a side of a first housing to a side of a second housing such that the housings can be interconnected according to several different arrangements, and a second element comprising a standardized electrical connection, wherein any side of a first housing secured to any side of a second housing is also electrically connected via the electrical elements of the first and second housings.

16. The data transmitter as set forth in claim 15, wherein the data modulator module supports both a first modulation technique and a second modulation technique.

17. The data transmitter as set forth in claim 15, wherein the power converter is integrated into a power supply portion of the system.

18. The data transmitter as set forth in claim 15, further including a plurality of input interfaces, the plurality of input interfaces including—
   a data input adapted to provide the data stream to the data modulator module;
   a power input adapted to provide a DC power signal to the power converter;
   a clock input adapted to provide a timing signal to the data modulator module;
   a modulation mode control input adapted to allow for selecting between a first modulation technique and a second modulation technique to be used by the data modulator module in modulating the data stream;
   a configuration interface adapted to provide operating parameters to the data modulator module and the power amplifier module; and
   a power control interface adapted to control operation of the power converter module.

19. A data transmitter for incorporation into a system, with the data transmitter being adapted to transmit at a microwave frequency, the data transmitter comprising:
   a data modulator module adapted to receive a data stream from the system and to modulate the data stream, wherein the data modulator module supports a plurality of modulation techniques, with the data modulator module including
      a digital processor adapted to process the data stream,
      a local oscillator adapted to provide a carrier signal having a programable frequency, and
      a quadrature mixer adapted to combine the processed data stream with the carrier signal;
   a power amplifier adapted to receive the modulated data stream from the data modulator module and to amplify and output the modulated data stream for transmittal, with the power amplifier including a driver submodule and an output stage submodule;
   a power converter adapted to provide power to both the data modulator module and the power amplifier, with the power converter including a first DC-to-DC converter submodule for providing power to the output stage of the power amplifier at a first voltage and a second DC-to-DC converter submodule for providing power to the data modulator module and the driver submodule of the power amplifier at a second voltage; and a plurality of housings for housing the data modulator module, the power amplifier module, and the power converter module such that each module is physically separate and distinct from the other modules, wherein a side of a first housing is mechanically and electrically connectable to either of a first or a second side of a second housing such that communication of electrical signals between modules is preserved regardless of which side of the second housing the first housing is connected to, wherein each housing further includes at least the data modulator module, the power amplifier module, or the power converter module, such that each module is physically separate and distinct from the other modules, each of said housings having a plurality of sides, wherein each side includes at least two connecting elements, with a first element comprising a standardized connection for rigidly aligning a side of a first housing to a side of a second housing such that the housings can be interconnected according to several different arrangements, and a second element comprising a standardized electrical connection, wherein any side of a first housing secured to any side of a second housing is also electrically connected via the electrical elements of the first and second housings.

20. The data transmitter as set forth in claim 19, wherein the power converter is integrated into a power supply portion of the system.

21. The data transmitter as set forth in claim 19, further including a plurality of input interfaces, with each of the input interfaces being a high impedance termination, the plurality of input interfaces including— a data input adapted to provide the data stream to the data modulator module;

a power input adapted to provide a DC power signal to the power converter;

a clock input adapted to provide a timing signal to the data modulator module;

a modulation mode control input adapted to allow for selecting a particular modulation technique from the plurality of modulation techniques to be used by the data modulator module in modulating the data stream;

a configuration interface adapted to provide operating parameters to the data modulator module and the power amplifier module; and a power control interface adapted to control operation of the power converter module.

* * * * *